(12) United States Patent
Tsuji

(10) Patent No.: US 7,562,240 B2
(45) Date of Patent: Jul. 14, 2009

(54) APPARATUS AND METHOD FOR SELECTING BETWEEN OPERATING MODES FOR A MULTI-CORE PROCESSOR

(75) Inventor: Kazuhiko Tsuji, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 482 days.

(21) Appl. No.: 11/404,432

(22) Filed: Apr. 14, 2006

(65) Prior Publication Data

US 2007/0118773 A1 May 24, 2007

(30) Foreign Application Priority Data

Nov. 18, 2005 (JP) ............... 2005-334377

(51) Int. Cl.
*G06F 1/26* (2006.01)
(52) U.S. Cl. .................. 713/322; 713/300; 713/324
(58) Field of Classification Search ............... 713/300, 713/322, 324
See application file for complete search history.

(56) References Cited

U.S. PATENT DOCUMENTS

| | | | |
|---|---|---|---|
| 5,508,599 A * | 4/1996 | Koenck | 320/138 |
| 5,913,068 A | 6/1999 | Matoba | |
| 6,252,380 B1 * | 6/2001 | Koenck | 320/150 |
| 6,718,475 B2 * | 4/2004 | Cai | 713/323 |
| 6,804,632 B2 * | 10/2004 | Orenstien et al. | 702/188 |
| 6,972,545 B2 * | 12/2005 | Tsuchiya et al. | 320/132 |
| 7,231,531 B2 * | 6/2007 | Cupps et al. | 713/322 |
| 7,249,268 B2 * | 7/2007 | Bhandarkar | 713/320 |
| 2005/0154931 A1 * | 7/2005 | Oh | 713/300 |

FOREIGN PATENT DOCUMENTS

JP 09-138716 5/1997

* cited by examiner

*Primary Examiner*—Nitin C Patel
(74) *Attorney, Agent, or Firm*—Blakely, Sokoloff, Taylor & Zafman LLP.

(57) ABSTRACT

According to one embodiment, an information processing apparatus includes a main body in which a battery is mountable and a processor provided in the main body and including a first core and a second core. The information processing apparatus further comprises a power supply controller that executes a process for setting the processor in one of a multi-core mode in which the first core and the second core are operable and a single-core mode in which one of the first core and the second core is operable, in accordance with rating information indicative of a performance of the battery mounted in the main body, which is stored in the battery.

12 Claims, 5 Drawing Sheets

| Rating of battery | CPU operation mode |
|---|---|
| Discharge current rating = large | Multi-core operation |
| Discharge current rating = small | Single-core operation |

APPARATUS AND METHOD FOR SELECTING BETWEEN OPERATING MODES FOR A MULTI-CORE PROCESSOR

CROSS-REFERENCE TO RELATED APPLICATIONS

This application is based upon and claims the benefit of priority from Japanese Patent Application No. 2005-334377, filed Nov. 18, 2005, the entire contents of which are incorporated herein by reference.

BACKGROUND

1. Field

Embodiments of the present invention relate to an information processing apparatus such as a personal computer, and to a processor control method for controlling a processor provided in the apparatus.

2. Description of the Related Art

In recent years, various notebook personal computers, which are battery-powerable, have been developed. The time in which the computer can be driven by a battery ("battery driving time") greatly varies depending on the performance of the battery that is mounted in the computer. A battery with a larger capacity has a longer battery driving time, but the cost (price) of the battery increases accordingly. Thus, if a large-capacity battery is mounted in the computer, the cost of the computer increases accordingly.

Under the circumstances, a computer has recently been developed, in which a plurality of kinds of batteries having different performances can selectively be mounted.

In addition, recently, in order to enhance the system performance, a processor having a dual core architecture has been developed. However, when a plurality of cores operate at the same time, the power consumption of the processor greatly increases.

Jpn. Pat. Appln. KOKAI Publication No. 9-138716 discloses a computer system having a function of dynamically varying the number of operating processors in accordance with the residual capacity of the battery.

In KOKAI Publication No. 9-138716, however, no consideration is given to the rating of the battery that is mounted in the computer.

In order to make the computer operate normally, it is necessary that the battery have such a performance as to be able to discharge an electric current with a value higher than a maximum consumption current value of the computer. If a plurality of processors or a plurality of cores operate at the same time despite a battery with a low performance being mounted in the computer, the maximum consumption current of the computer exceeds the performance of the battery, leading to a drawback such as system hang-up.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An embodiment of the present invention will now be described with reference to the accompanying drawings.

Figure 1:
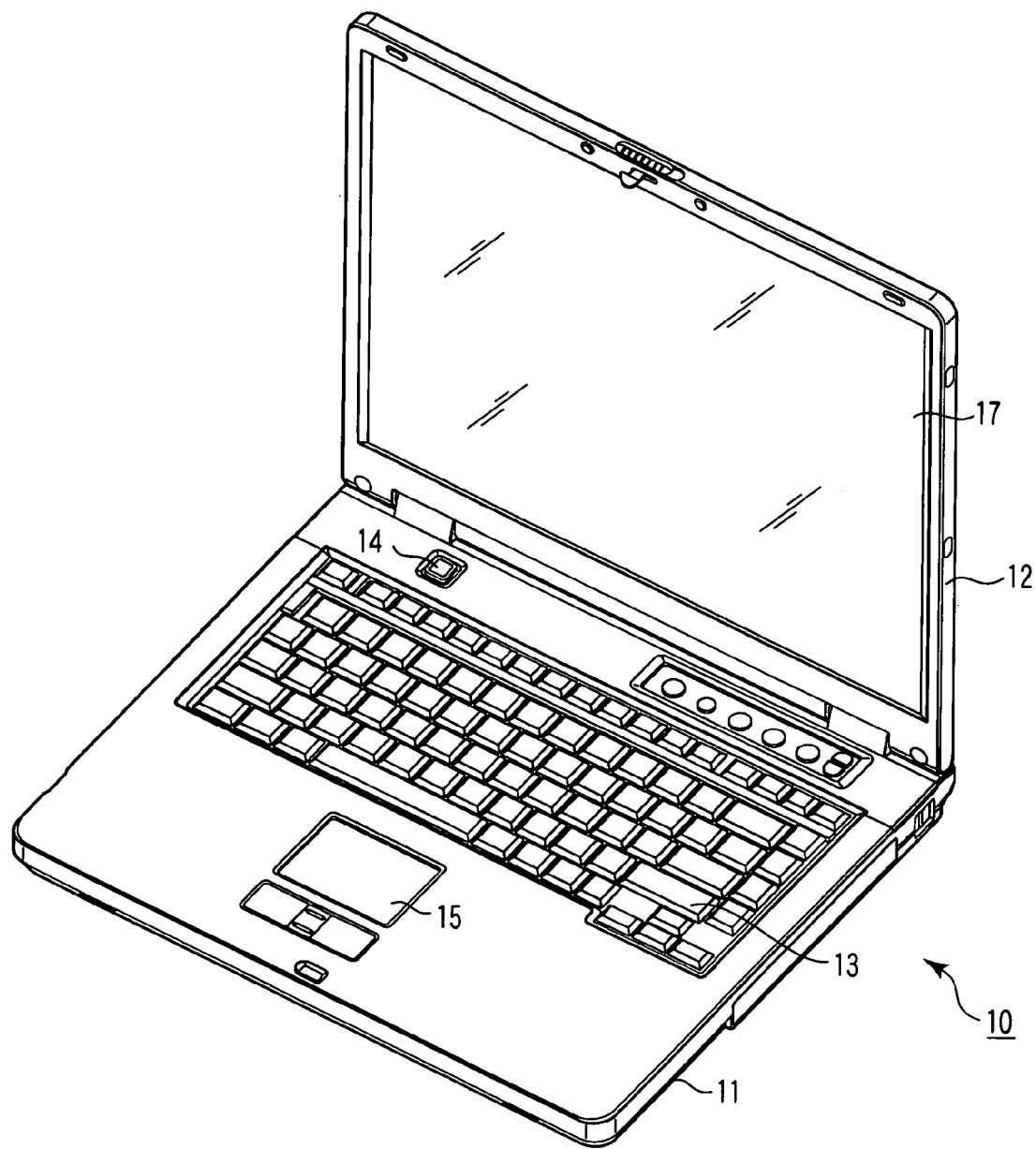
FIG. 1 is a perspective view showing an example of the external appearance of a computer according to an embodiment of the present invention.
Figure 2:
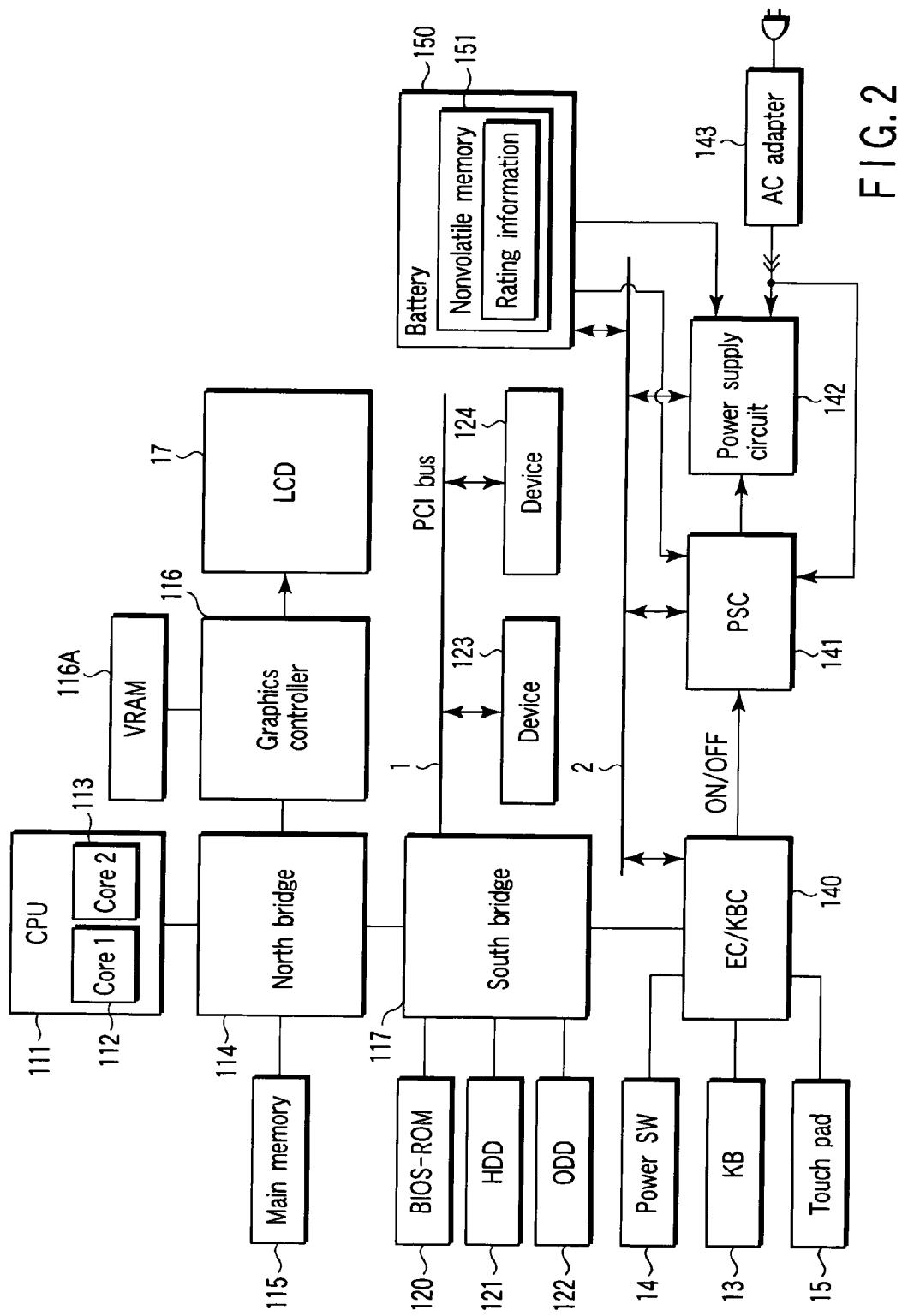
FIG. 2 is a block diagram showing an example of the system configuration of the computer shown in FIG. 1.

Referring to FIG. 1 and FIG. 2, the structure of an information processing apparatus according to the embodiment of the invention is described. The information processing apparatus is realized, for example, as a battery-powerable notebook-type portable personal computer 10. Of course, the information processing apparatus may be any other battery-powered device including, but not limited or restricted to a cellular telephone, personal digital assistant or the like.

FIG. 1 is a perspective view showing the computer 10 in the state in which a display unit thereof is opened. The computer 10 comprises a computer main body 11 and a display unit 12. A display device that is composed of an LCD (Liquid Crystal Display) 17 is built in the display unit 12. The display screen of the LCD 17 is positioned at an approximately central part of the display unit 12.

The display unit 12 is attached to the computer main body 11 such that the display unit 12 is freely rotatable between an open position and a closed position. The computer main body 11 has a thin box-shaped casing in which a battery can detachably be attached. The battery is mounted in a battery receiving portion which is provided, for example, on a bottom surface of the computer main body 11.

A keyboard 13, a power button switch 14 for powering on/off the computer 10, and a touch pad 15 are disposed on the top surface of the computer main body 11.

Next, referring to FIG. 2, the system configuration of the computer 10 is described.

The computer 10, as shown in FIG. 2, comprises a CPU 111, a north bridge 114, a main memory 115, a graphics controller 116, a south bridge 117, a BIOS-ROM 120, a hard disk drive (HDD) 121, an optical disc drive (ODD) 122, various PCI (Peripheral Component Interconnect) devices 123, 124, an embedded controller/keyboard controller IC (EC/KBC) 140, a power supply controller (PSC) 141 and a power supply circuit 142.

The CPU 111 is a processor that is provided for controlling the operation of the computer 10. The CPU 111 executes an operating system and various application programs, which are loaded in the main memory 115 from the HDD 121. The CPU 111 also executes a system BIOS (Basic Input/Output System) that is stored in the BIOS-ROM 120. The system BIOS is a program for hardware control.

According to this embodiment, the CPU 111 includes two cores 112 and 113 which are physically different. The cores 112 and 113 can operate independently from each other. Each of the cores 112 and 113 can execute a task. Specifically, each of the cores 112 and 113 includes an instruction fetch unit, a decode unit and an execution unit. In the CPU 111, tasks to be processed are distributed to the two cores 112 and 113. Thereby, the system performance can be enhanced.

The system BIOS has a function of executing a processor control process which controls the power consumption of the CPU 111. The processor control process is a process for causing the CPU 111 to operate in a multi-core mode or a single-core mode in accordance with the rating of the battery that is mounted in the computer main body 11. Specifically, the system BIOS sets the CPU 111 in one of a multi-core mode and a single-core mode in accordance with the rating of the battery that is mounted in the computer main body 11.

The multi-core mode is a mode in which the two cores 112 and 113 can operate. In the multi-core mode, tasks can be executed in parallel by the two cores 112 and 113. Needless to say, in the multi-core mode, when the load on the CPU 111 is small, only one of the two cores 112 and 113 can be operated. On the other hand, the single-core mode is a mode in which only one of the two cores 112 and 113 can be operated. In the single-core mode, the two cores 112 and 113 do not operate at the same time. Basically, the maximum consumption current of the CPU 111 in the multi-core mode is double the maximum consumption current of the CPU 111 in the single-core mode.

The north bridge 114 is a bridge device that connects a local bus of the CPU 111 and the south bridge 117. The north bridge 114 includes a memory controller that access-controls the main memory 115. The north bridge 114 has a function of executing communication with the graphics controller 116 via, e.g. a PCI Express bus.

The graphics controller 116 is a display controller for controlling the LCD 17 that is used as a display monitor of the computer 10. The graphics controller 116 includes a video memory (VRAM) 116A and generates a video signal, which forms a display image to be displayed on the LCD 17, on the basis of display data that is written in the video memory (VRAM) 116A by the OS/application program.

The south bridge 117 is connected to a PCI bus 1 and executes communication with the PCI devices 123 and 124 via the PCI bus 1. The south bridge 117 includes an IDE (Integrated Drive Electronics) controller or a Serial ATA controller for controlling the hard disk drive (HDD) 121 and optical disc drive (ODD) 122.

The embedded controller/keyboard controller IC (EC/KBC) 140 is a 1-chip microcomputer in which an embedded controller for power management and a keyboard controller for controlling the keyboard (KB) 13 and touch pad 15 are integrated. The EC/KBC 140 has a function of powering on/off the computer 10 in response to the user's operation of the power button switch 14. The power on/off control of the computer 10 is executed by cooperation of the EC/KBC 140 and power supply controller (PSC) 141. Upon receiving an ON signal from the EC/KBC 140, the power supply controller (PSC) 141 controls the power supply circuit 142 and powers on the computer 10. Upon receiving an OFF signal from the EC/KBC 140, the power supply controller (PSC) 141 controls the power supply circuit 142 and powers off the computer 10.

The power supply controller (PSC) 141 has a function of determining whether a battery 150 is mounted in the computer main body 11, and a function of determining whether an external power supply (AC adapter 143) is connected to the computer main body 11. A determination result of the mounting/non-mounting of the battery 150 and a determination result of the connection/disconnection of the external power supply are set in a status register in the EC/KBC 140 by the power supply controller (PSC) 141.

The power supply circuit 142 uses power from the battery 150 mounted in the computer main body 11 or power from the AC adapter 143 connected to the computer main body 11 as the external power supply, thereby generating operational powers to the respective components. When the external power supply (AC adapter 143) is connected to the computer main body 11, the power supply circuit 142 uses the power from the external power supply to generate the operational powers to the respective components, and also uses the power from the external power supply to charge the battery 150.

The EC/KBC 140, power supply controller (PSC) 141, power supply circuit 142 and battery 150 are interconnected by a bus 2 such as a serial (I2C) bus. While the battery 150 is mounted in the computer main body 11 or while the AC adapter 143 is connected to the computer main body 11, the operational power from the power supply circuit 142 is normally supplied to the EC/KBC 140 and power supply controller (PSC) 141.

The battery 150 comprises a plurality of secondary cells and a nonvolatile memory 151. The nonvolatile memory 151 prestores rating information indicative of the performance of the battery 150. The rating information includes, e.g. a discharge current rating (A: Ampere) indicative of a maximum discharge current of the battery 150, a rating capacity (Ah: Ampere hour) of the battery 150, cell number information indicative of the number of secondary cells mounted in the battery 150, a cycle number indicative of the number of times of execution of charge/discharge, and the total time of use of the battery 150.

In the computer 10, a plurality of kinds of batteries with different ratings can be used. Each of the plural kinds of batteries includes a nonvolatile memory that stores rating information indicative of the own performance. In this embodiment, for example, it is assumed that two kinds of batteries are selectively mounted in the computer main body 11.

(1) Small-capacity Battery

The number of cells of the small-capacity battery is, e.g. 3. The rating capacity (Ah) of the small-capacity battery may be approximately 2200 mAh for example. The maximum discharge current of the small-capacity battery may be 4000 mA (milliamperes) for example.

(2) Large-capacity Battery

The number of cells of the large-capacity battery may be 6. The rating capacity (Ah) of the large-capacity battery may be 4700 mAh for example. The maximum discharge current of the large-capacity battery may be 7000 mA for example.

When the battery 150 is mounted in the computer main body 11, the power supply controller (PSC) 141 reads the rating information from the nonvolatile memory 151 of the battery 150 via the serial bus 2, and sets the read rating information in the EC/KBC 140. When the computer 10 is powered on, the system BIOS executes a process for setting the CPU 111 in one of the multi-core mode and single-core mode on the basis of the rating information of the battery 150, which is set in the EC/KBC 140.

Figures 3, 4:
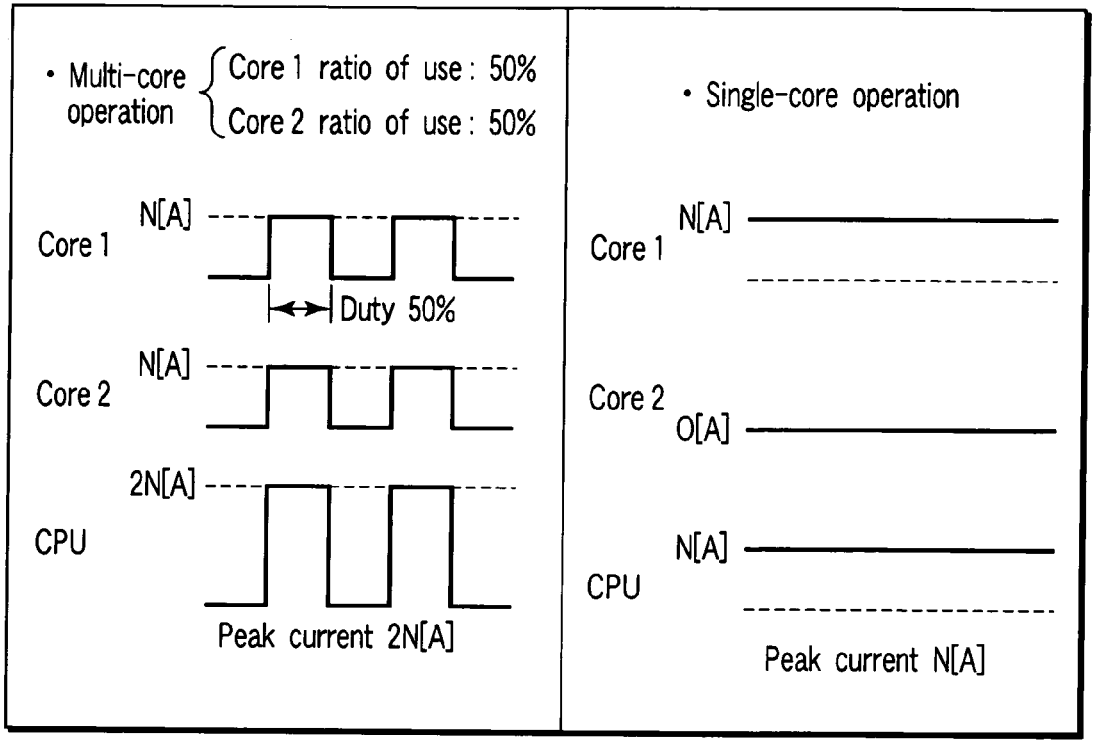
FIG. 3 is a view for explaining an example of consumption current of a processor (CPU) which is used in the computer shown in FIG. 1.
FIG. 4 is a view showing an example of the relationship between the rating of the battery and the CPU operation mode in the computer shown in FIG. 1.

Next, referring to FIG. 3, the consumption current of the CPU 111 is described.

(1) Case in which a Throttling Control is Executed in the Multi-core Mode:

In the multi-core mode, even if the two cores are intermittently operated by a throttling control such as SpeedStep® technology, the value of the peak current, which is consumed by the CPU 111, is 2N(A), where N is the consumption current of one core.

(2) Case of the single-core Mode:

In the single-core mode, the number of operating cores is only one. Thus, in the single-core mode, the value of the peak current that is consumed by the CPU 111 is 1N(A). Accordingly, by operating the CPU 111 in the single-core mode, the consumption current of the system can efficiently be reduced.

FIG. 4 shows an example of the relationship between the rating of the battery and the CPU operation mode.

In the present embodiment, if the maximum discharge current value (also referred to as "discharge rating value") of the battery 150 mounted in the computer main body 11 is not less than a reference value, the multi-core mode is selected. On the other hand, if the maximum discharge current value of the battery 150 mounted in the computer main body 11 is less than the reference value, the single-core mode is selected.

The reference value is preset in consideration of the consumption current of the CPU 111 in the multi-core mode, and the consumption current of the other components. The reference value is, e.g. 6000 mA. In this case, if the battery 150 mounted in the computer main body 11 is the above-mentioned large-capacity battery, the multi-core mode is selected. If the battery 150 mounted in the computer main body 11 is the above-mentioned small-capacity battery, the single-core mode is selected.

Figure 5:
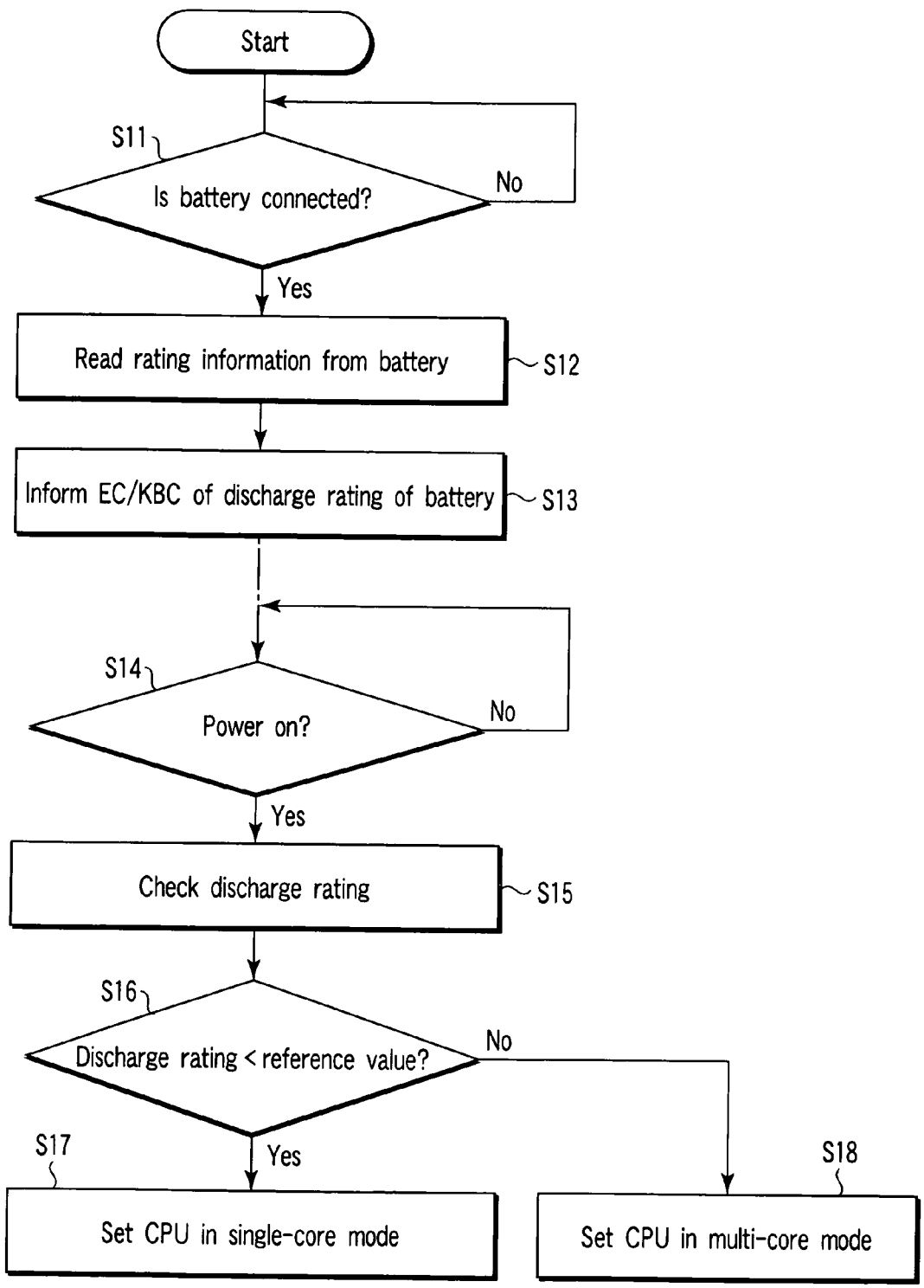
FIG. 5 is a flow chart showing an example of the procedure of a CPU control process that is executed by the computer shown in FIG. 1.

Next, referring to a flow chart of FIG. 5, a description is given of an example of the procedure of the CPU control process for setting the operation mode of the CPU 111 in one of the multi-core mode and single-core mode.

The power supply controller (PSC) 141 determines whether the battery 150 is mounted in the computer main body 11 (block S11). For example, the power supply controller (PSC) 141 monitors the voltage value of a predetermined one of electrodes for communication with the battery 150, which are provided in the battery receiving portion within the computer main body 11. When the voltage value changes to a predetermined logic level, the power supply controller (PSC) 141 determines that the battery 150 is mounted in the computer main body 11. Even if the external power supply (AC adapter 143) is not connected to the computer main body 11, when the battery 150 is mounted, the operational power is supplied at this time instant to the power supply controller (PSC) 141 and EC/KBC 140. Thereby, even if the external power supply (AC adapter 143) is not connected to the computer main body 11, the power supply controller (PSC) 141 can detect the mounting of the battery 150 in the computer main body 11.

When the battery 150 is mounted in the computer main body 11, the power supply controller (PSC) 141 acquires rating information from the battery 150 (block S12). In block S12, after the battery 150 is mounted, the power supply controller (PSC) 141 starts a process for read-accessing the nonvolatile memory 151 of the battery 150 via the serial bus 2, thereby acquiring the rating information stored in the nonvolatile memory 151.

Thereafter, the power supply controller (PSC) 141 sets the acquired rating information in a predetermined status register in the EC/KBC 140 via the serial bus 2, thus informing the EC/KBC 140 of the acquired rating information (block S13). In block S13, of the acquired rating information, only a parameter that is actually used in the CPU control process may be set in the EC/KBC 140. For example, when the maximum discharge current value (discharge rating) is used in the CPU control process, the power supply controller (PSC) 141 sets the maximum discharge current value (discharge rating), which is included in the acquired rating information, in the predetermined status register in the EC/KBC 140.

When the computer main body 11 is powered on in response to the user's operation of the power button switch 14 (YES in block S14), the CPU 111 first executes the system BIOS. The system BIOS checks the maximum discharge current value, which is set in the predetermined register in the EC/KBC 140, and compares the maximum discharge current value with the above-mentioned reference value (block S15).

If the maximum discharge current value is less than the above-mentioned reference value (YES in block S16), the system BIOS sets the CPU 111 in the single-core mode (block S17). If the maximum discharge current value is not less than the above-mentioned reference value (NO in block S16), the system BIOS sets the CPU 111 in the multi-core mode (block S18).

In blocks S17 and S18, the system BIOS, for example, sets mode designation information, which designates the operation mode (multi-core mode or single-core mode) of the CPU 111, in a predetermined register in the CPU 111. If the mode designation information designates the single-core mode, one of the two cores 112 and 113 is set in a low power state and the other core is set in an operation state. On the other hand, if the mode designation information designates the multi-core mode, both the cores 112 and 113 are set in the operation state.

The default operation mode of the CPU 111 may be either the multi-core mode or single-core mode.

As has been described above, in the present embodiment, the operation mode of the CPU 111 is determined in accordance with the maximum discharge current value of the battery 150 mounted in the computer main body 11, and the CPU 111 operates in the multi-core mode or single-core mode. Thereby, no matter which battery of any rating is mounted in the computer main body 11, it is possible to prevent such a situation from occurring that the maximum consumption current value of the system exceeds the maximum discharge current value of the battery 150. Therefore, the stable operation of the system can be ensured.

In addition, since the rating information is already acquired at the time of mounting of the battery, the CPU operation mode can immediately be determined when the computer main body 11 is powered on. It is thus possible to exactly prevent such a situation from occurring that the maximum consumption current value of the system exceeds the maximum discharge current value of the battery 150.

As described above, the maximum discharge current value of the large-capacity battery is greater than the reference value, and the maximum discharge current value of the small-capacity battery is less than the reference value. Thus, on the basis of the rating capacity of the battery mounted in the computer main body 11, it may be determined whether the CPU 111 is to be set in the multi-core mode or single-core mode.

Figure 6:
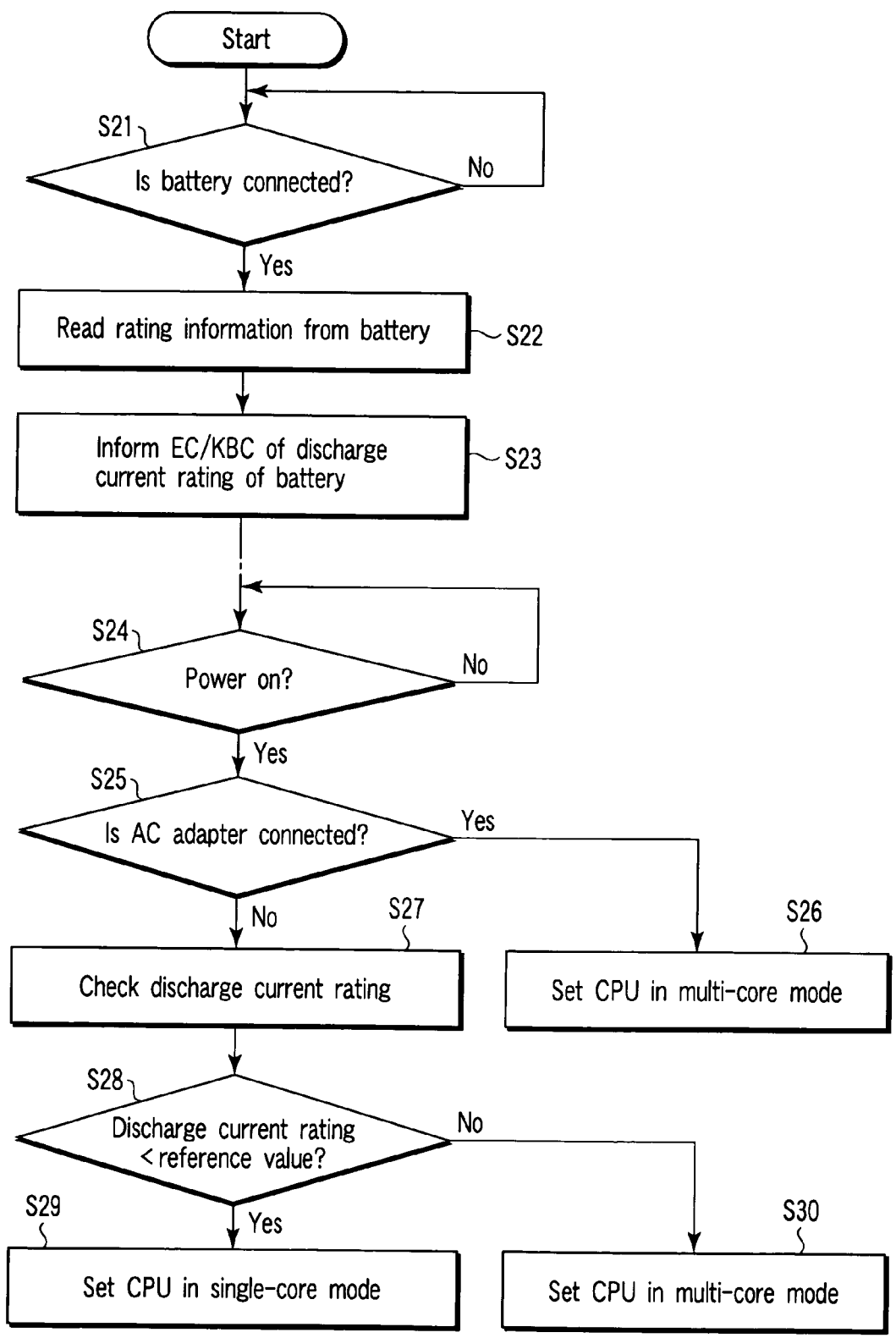
FIG. 6 is a flow chart showing another example of the procedure of the CPU control process that is executed by the computer shown in FIG. 1.

Even when the small-capacity battery (the battery with the maximum discharge current value of not greater than the reference value) is mounted in the computer main body 11, if the external power supply is connected to the computer main body 11, the system BIOS sets the CPU 111 in the multi-core mode. An example of the procedure of the CPU control process in this case will be described referring to a flow chart of FIG. 6.

The power supply controller (PSC) 141 determines whether the battery 150 is mounted in the computer main body 11 (block S21). When the battery 150 is mounted in the computer main body 11, the power supply controller (PSC) 141 acquires rating information from the battery 150 (block S22). In block S22, the power supply controller (PSC) 141 read-accesses the nonvolatile memory 151 of the battery 150 via the serial bus 2, thereby acquiring the rating information stored in the nonvolatile memory 151.

Thereafter, the power supply controller (PSC) 141 sets the acquired rating information in the predetermined status register in the EC/KBC 140 via the serial bus 2, thus informing the EC/KBC 140 of the acquired rating information (block S23). In block S23, of the acquired rating information, the maximum discharge current value (discharge rating), for instance, is set in the predetermined status register in the EC/KBC 140.

When the computer main body 11 is powered on in response to the user's operation of the power button switch 14 (YES in block S24), the CPU 111 first executes the system BIOS. The system BIOS refers to, e.g. a predetermined register in the EC/KBC 140, and determines whether the external power supply (AC adapter 143) is connected to the computer main body 11 (block S25).

If the external power supply (AC adapter 143) is connected to the computer main body 11 (YES in block S25), the system BIOS sets the CPU 111 in the multi-core mode, regardless of the rating information of the battery 150 (block S26).

On the other hand, if the external power supply (AC adapter 143) is not connected to the computer main body 11 (NO in block S25), the system BIOS checks the maximum discharge current value, which is set in the predetermined status register in the EC/KBC 140, and compares the maximum discharge current value with the above-mentioned reference value (block S27).

If the maximum discharge current value is less than the above-mentioned reference value (YES in block S28), the system BIOS sets the CPU 111 in the single-core mode (block S29). If the maximum discharge current value is not less than the above-mentioned reference value (NO in block S28), the system BIOS sets the CPU 111 in the multi-core mode (block S30).

As has been described above, according to the present embodiment, the operation mode of the CPU 111 is automatically determined on the basis of the rating of the battery 150 mounted in the computer main body 11, and the CPU 111 operates in the determined mode, that is, in the multi-core mode or single-core mode. It is thus possible to control the maximum consumption current of the system in accordance with the rating of the mounted battery 150, and to ensure the stable operation of the system.

As mentioned above, the rating information, which is usable in the CPU control process, is not only the maximum discharge current value, but also other rating values relating to the performance of the battery, such as the rating capacity, cell number, cycle number, total time of use, etc. However, with the use of the maximum discharge current value, the performance of the battery can be determined more exactly.

In the present embodiment, the control process for setting the operation mode of the CPU 111 in the multi-core mode or single-core mode is executed, for example, by the system BIOS. Alternatively, this control process may be executed by a dedicated hardware logic (controller). This controller may be provided, for example, in the north bridge 114.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   a main body in which a battery is mountable;
   a processor provided in the main body, the processor including a first core and a second core; and
   a power supply controller to acquire rating information indicative of a maximum discharge current value of the battery, to set the processor in a multi-core mode in which the first core and the second core are operable when the maximum discharge current value of the battery is not less than a reference value, and to set the processor in a single-core mode in which one of the first core and the second core is operable when the maximum discharge current value of the battery is less than the reference value.

2. The information processing apparatus according to claim 1, wherein the power supply controller obtains the rating information from the battery.

3. The information processing apparatus according to claim 2, wherein the rating information is stored in a nonvolatile memory housed in the battery, the battery being mounted to the main body.

4. The information processing apparatus according to claim 1, wherein the power supply controller includes means for determining whether an external power supply is coupled to the main body, and means for setting the processor in the multi-core mode when the external power supply is coupled to the main body.

5. The information processing apparatus according to claim 4, wherein the processor is set in the multi-core mode when the external power supply is coupled to the main body regardless of the rating information of the battery.

6. The information processing apparatus according to claim 1, wherein the first core of the processor is to operate independently from the second core of the processor.

7. An information processing apparatus comprising:
   a main body in which a battery is mountable;
   a processor provided in the main body and including a first core and a second core;
   means for acquiring rating information indicative of a maximum discharge current value of the battery after the battery is mounted in the main body, the rating information being stored in the battery mounted in the main body; and
   control means for executing a process for setting the processor in a multi-core mode in which both the first core and the second core operate when the maximum discharge current value of the battery is not less than a reference value, and for setting the processor in a single-core mode in which one of the first core and the second core operates when the maximum discharge current value of the battery is less than the reference value.

8. The information processing apparatus according to claim 7, wherein the control means determines, when the main body is powered on, whether an external power supply is connected to the main body, and sets the processor in the multi-core mode, regardless of the acquired rating information, when it is determined that the external power supply is connected to the main body.

9. A method for controlling an operation of a processor including a first core and a second core and provided in a main body for receiving a battery, comprising:
   acquiring rating information indicative of a maximum discharge current value of a battery that is mounted in the main body; and
   executing a control process for setting the processor in one of a multi-core mode in which the first core and the second core operate when the maximum discharge current value of the battery is not less than a reference value, and for setting the processor in a single-core mode in which one of the first core and the second core operates when the maximum discharge current value of the battery is less than the reference value.

10. The method according to claim 9, wherein the rating information is stored within and acquired from the battery.

11. The method according to claim 9, further comprising:

determining whether an external power supply is connected to the main body; and setting the processor in the multi-core mode, regardless of the acquired rating information upon determining that the external power supply is connected to the main body.

12. The method according to claim 10, wherein the rating information is acquired from the battery that is mounted to the main body.

* * * * *